United States Patent
Seo

(10) Patent No.: US 7,578,377 B2
(45) Date of Patent: Aug. 25, 2009

(54) CLUTCH OF AN AUTOMATIC TRANSMISSION

(75) Inventor: Kang Soo Seo, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 422 days.

(21) Appl. No.: 11/601,536

(22) Filed: Nov. 17, 2006

(65) Prior Publication Data

US 2008/0073176 A1 Mar. 27, 2008

(30) Foreign Application Priority Data

Sep. 21, 2006 (KR) .................. 10-2006-0091907

(51) Int. Cl.
*F16D 25/0638* (2006.01)
(52) U.S. Cl. .................. 192/85 AA; 188/71.5
(58) Field of Classification Search ........... None
See application file for complete search history.

(56) References Cited

U.S. PATENT DOCUMENTS 3,765,514 A * 10/1973 Harrison .................. 188/72.4
4,356,901 A * 11/1982 Koehler et al. ............. 192/70.2
4,856,635 A * 8/1989 Vlamakis .................. 192/70.12

* cited by examiner

*Primary Examiner*—Richard M. Lorence
(74) *Attorney, Agent, or Firm*—Edwards Angell Palmer & Dodge LLP; Peter F. Corless

(57) ABSTRACT

A clutch or a brake of an automatic transmission comprises a plurality of main plates, a plurality of friction plates that are disposed alternatively to the plurality of main plates, and a piston selectively pressurizing the plurality of main plates, wherein each of the plurality of friction plates includes a bent portion, the piston includes a convex portion, and at least one of the bent portions is arranged in substantially parallel with the convex portion.

7 Claims, 2 Drawing Sheets

PRIOR ART

CLUTCH OF AN AUTOMATIC TRANSMISSION

CROSS-REFERENCE TO RELATED APPLICATION

This application claims priority to and the benefit of Korean Patent Application No. 10-2006-0091907 filed in the Korean Intellectual Property Office on Sep. 21, 2006, the entire contents of which are incorporated herein by reference.

BACKGROUND OF THE INVENTION (a) Field of the Invention

The present invention relates to an automatic transmission of a vehicle, and more particularly, to a clutch (or a brake) of an automatic transmission.

(b) Background

Generally, a clutch mounted to an automatic transmission operates when an automatic transmission is converted to a target shift-speed during a shifting operation.

Such a conventional clutch of an automatic transmission includes a rear clutch, a front clutch, etc.

As shown in FIG. 1, a conventional clutch (or brake) includes a piston 30, a plurality of main plates 10, a plurality of friction plates 20 disposed alternatively to the plurality of main plates 10, and a reaction plate 40. The plurality of main plates 10 include a first, second, and third main plates 11, 12, and 13 that are sequentially arranged, and the plurality of friction plates 20 include a first, second, and third friction plates 21, 22, and 23 that are sequentially arranged.

Accordingly, when hydraulic pressure is supplied to the piston 30, the main plates 10 move so as to contact the friction plates 20, and shifting operation is consequently performed at a target shift-speed. On the other hand, when the hydraulic pressure is released from the piston 30, the main plates 10 become disjointed from the friction plates 20 by restoring force created by the reaction plate 40, and operational elements are consequently released.

However, as shown in FIG. 1, since the piston 30 includes a convex portion 31 that is convex toward the first friction plate 21, the space between the first friction plate 21 having a linear configuration and the convex portion 31 of the piston 30 becomes narrower in one end portion of the plate. Therefore, when the piston 30 is operated by hydraulic pressure, interference between the piston 30 and the first friction plate 21 can be induced. Such interference can eventually shorten the lifetime of the piston 30 and friction plates 20, and it can disturb proper shifting operation at a target shift-speed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a clutch (or a brake) of an automatic transmission having an advantage of preventing interference between a piston and a friction plate.

In one aspect, the present invention provides a clutch (or a brake) of an automatic transmission, comprising a plurality of main plates, a plurality of friction plates disposed alternatively to the plurality of main plates, and a piston selectively pressurizing the plurality of main plates, wherein each of the plurality of friction plates includes a bent portion, the piston includes a convex portion, and at least one of the bent portions is arranged in substantially parallel with the convex portion.

Such clutch (or a brake) of an automatic transmission may further comprise a reaction plate to supply the plurality of main plates and the plurality of friction plates with restoring force.

In a clutch (or a brake) according to a preferred embodiment of the present invention, at least one of the bent portions may preferably be convex in the direction opposite to the piston.

In another preferred embodiment, the convex portion of the piston may be protruded toward a first friction plate of the plurality of friction plates.

Preferably, at least one of the bent portions may be formed at a position corresponding to the convex portion of the piston.

In still another preferred embodiment, the piston may further comprise a contact portion connected to a first main plate of the plurality of main plates.

In another aspect, motor vehicles are provided that comprise a described automatic transmission.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present automatic transmission will be particularly useful with a wide variety of motor vehicles.

Other aspects of the invention are discussed infra.

The present invention will be better understood from reading the description which follows, given by way of non-limiting example, with reference to the attached drawings.

| 100: main plate | 200: friction plate |
| 201: bent portion | 300: piston |
| 310: convex portion | 400: reaction plate |

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
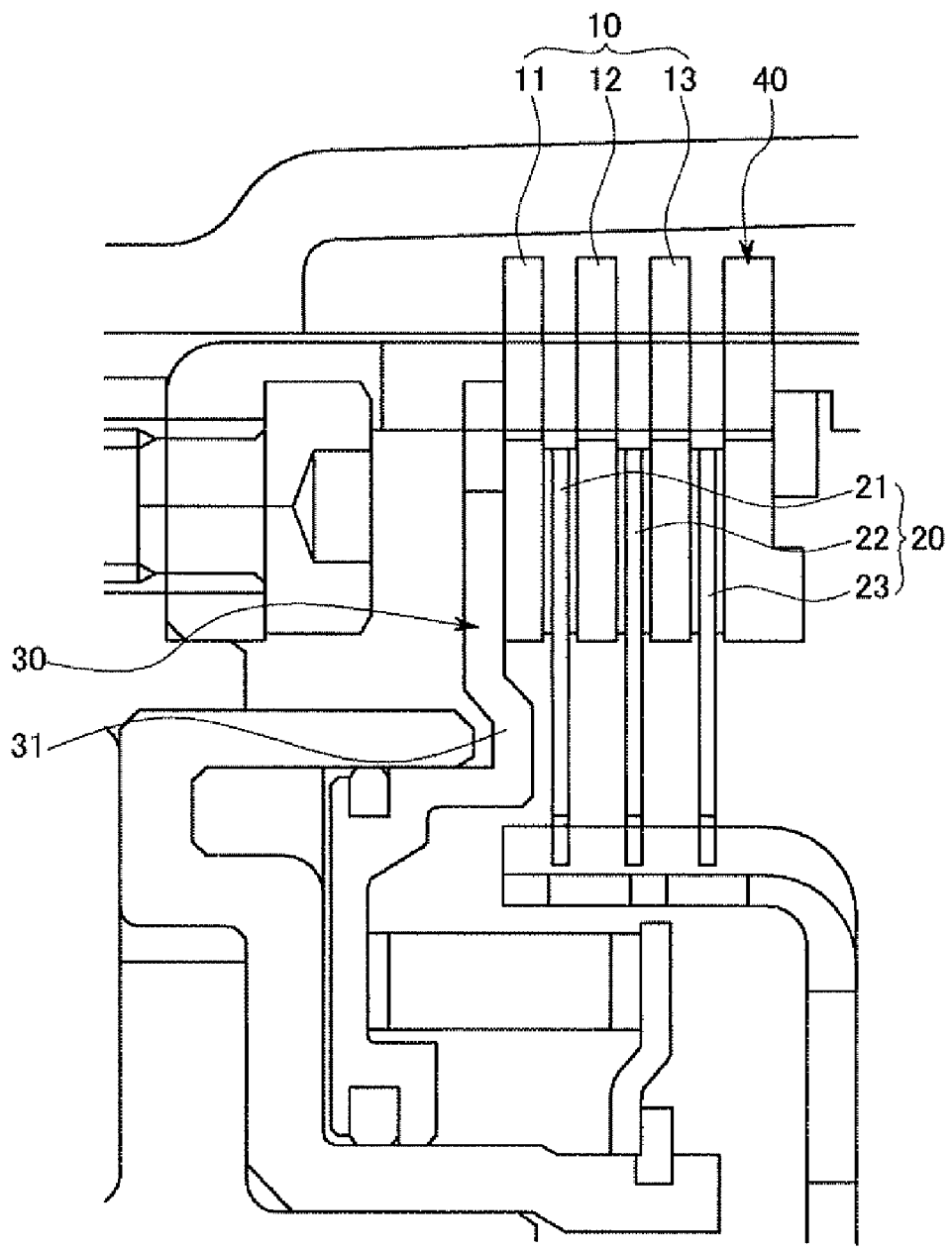
FIG. 1 is a schematic drawing showing a conventional clutch of an automatic transmission.
Figure 2:
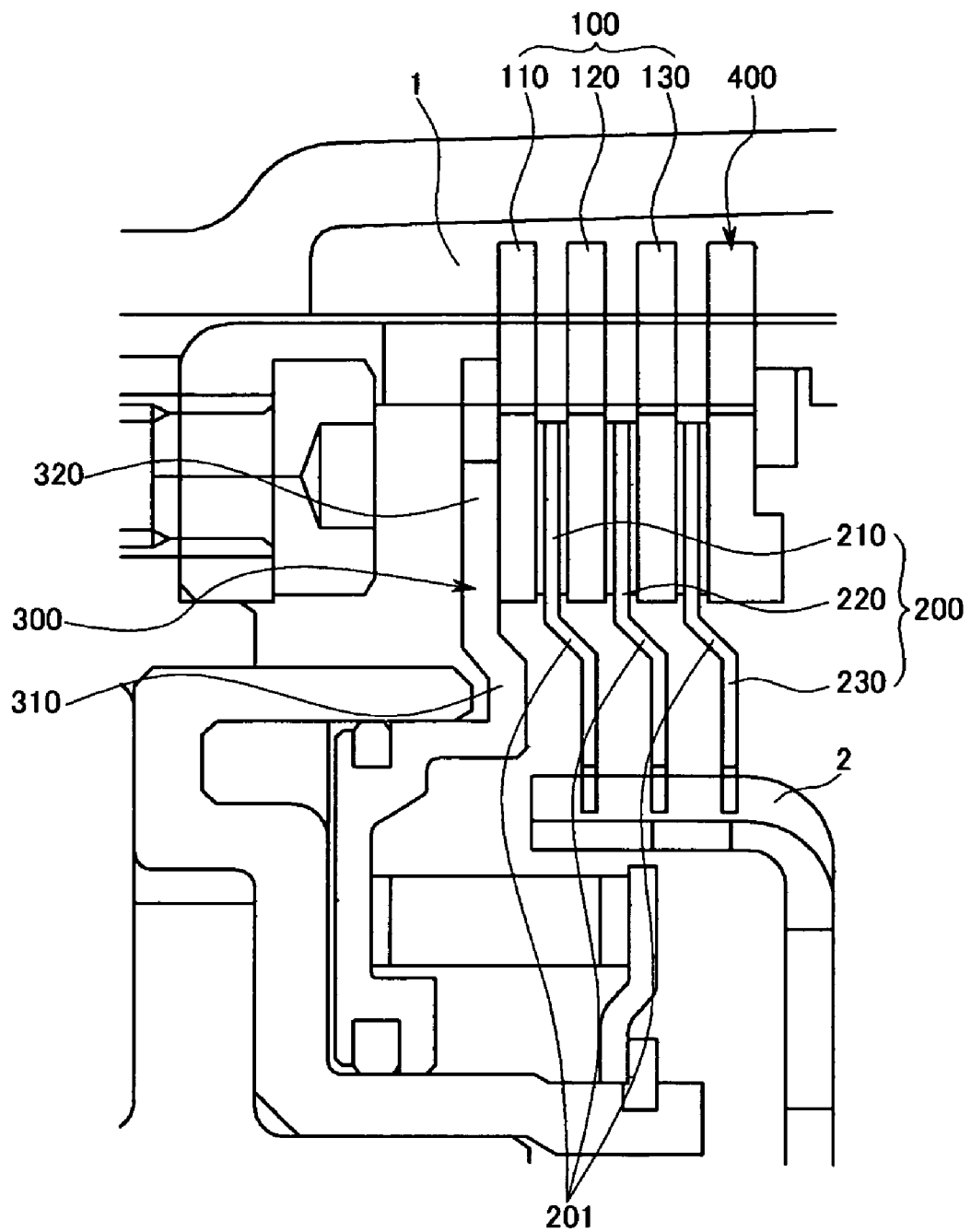
FIG. 2 is a schematic drawing showing a clutch of an automatic transmission according to an exemplary embodiment of the present invention.

FIG. 2 is a schematic drawing showing a clutch of an automatic transmission according to an exemplary embodiment of the present invention.

As shown in FIG. 2, a clutch of an automatic transmission according to an exemplary embodiment of the present invention includes a plurality of main plates 100, a plurality of friction plates 200, and a reaction plate 400.

The plurality of main plates 100 include a first, second and third main plates 110, 120, and 130, and each of the first, second and third main plates 110,120, and 130 having a hollow circular shape is included in a first body 1 of the clutch so as to slide left or right.

The plurality of friction plates 200 include a first, second and third friction plates 210, 220, and 230, and each of the first, second and third friction plates 210, 220, and 230 having a hollow circular shape is included in a second body 2 of the clutch so as to slide left or right.

Particularly, each of the first, second and third friction plates 210, 220, and 230 is disposed alternatively to each of the first, second, and third main plates 110, 120, and 130.

The piston 300 pressurizes the first, second, and third main plates 110, 120, and 130. For example, when a shifting operation needs to be performed at a target shift-speed, the piston 300 supplied with hydraulic pressure moves the first, second and third main plates 110, 120, and 130 so as to contact the first, second and third friction plates 210, 220, and 230.

The reaction plate 400 supplies the plurality of main plates 100 and the plurality of friction plates 200 with restoring force. For example, when operational elements need to be released, the hydraulic pressure is released from the piston 300, and the plurality of main plates 100 and the plurality of friction plates 200 become disjointed from one another by the restoring force of the reaction plate 400.

Particularly, when the shifting operation is performed at a target shift-speed, each of the plurality of the friction plates 200 includes a bent portion 201 that is convex in the direction opposite to the piston 300 in order to prevent interference between the friction plate 200 and the piston 300, namely in order to prevent the friction plate 200 from interfering with the movement of the piston 300.

Hereinafter, relationship between the piston 300 and the plurality of friction plates 200 will be described in detail with reference to FIG. 2.

The piston 300 includes a convex portion 310 and a contact portion 320. In more detail, the convex portion 310 of the piston 300 is a protruded portion toward the first friction plate 210 of the plurality of friction plates 200. In addition, the contact portion 320 of the piston 300 is a contact portion to the first main plate 110 of the plurality of main plates 100.

In addition, each bent portion 201 of the first, second and third friction plates 210, 220, and 230 is located at the position corresponding to the convex portion 310 of the piston 300. Accordingly, since the first friction plate 210 includes the bent portion 201 that is convex in the direction opposite to the convex portion 310 of the piston 300, interference between the piston 300 and the first friction plate 210 can be prevented. Furthermore, since the second and third friction plates 220 and 230 have the same shape as the first friction plate 210, interference between the second and third friction plates 220 and 230 can be prevented by the margin space formed therebetween.

In addition to the clutches, the present invention also comprises brakes of an automatic transmission. Although not shown in the drawings, a brake of an automatic transmission includes constituent elements that are almost the same as those of a clutch of an automatic transmission. For example, a brake may have first, second, and third friction plates and at least one of the plates may include a bent portion 201.

Hereinafter, the structure of a brake of an automatic transmission will be described in detail with reference to FIG. 2.

A brake includes a low coast brake that is connected to an inner race of a forward one-way clutch (FWD O.W.C) in order to operate at the same time as the operation of the forward brake (FWD Brake). Such a low coast brake, like the clutch as described above, includes a piston 300, a plurality of main plates 100, and a plurality of friction plates 200. At least one of the plurality of friction plates may include a bent portion. The piston includes a convex portion 310. At least one of the bent portions may be arranged in substantially parallel with the convex portion in order to prevent interference between the friction plates and the convex portion 310 of the piston 300.

As discussed above, clutches (or brakes) of an automatic transmission according to the present invention can prevent interference between a piston and a friction plate by designing the shape of a predetermined portion of a friction plate as similar to that of a convex portion of a piston.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic transmission comprising:
   a plurality of main plates;
   a plurality of friction plates that are disposed alternatively to the plurality of main plates; and
   a piston selectively pressurizing the plurality of main plates, wherein
   each of the plurality of friction plates includes a bent portion, the piston includes a convex portion, and at least one of the bent portions is arranged in substantially parallel with the convex portion.

2. The automatic transmission of claim 1, further comprising:
   a reaction plate supplying the plurality of main plates and the plurality of friction plates with restoring force.

3. The automatic transmission of claim 1, wherein at least one of the bent portions is convex in the direction opposite to the piston.

4. The automatic transmission of claim 1, wherein the convex portion of the piston is protruded to a first friction plate of the plurality of friction plates.

5. The automatic transmission of claim 4, wherein at least one of the bent portions is formed at a position corresponding to the convex portion of the piston.

6. The automatic transmission of claim 5, wherein the piston further comprises a contact portion connected to a first main plate of the plurality of main plates.

7. A motor vehicle comprising the automatic transmission of claim 1.

* * * * *